March 23, 1954
W. J. HUGHES
2,673,181
SLURRY TYPE LIQUID TREATING APPARATUS
Filed Feb. 26, 1951
3 Sheets-Sheet 1
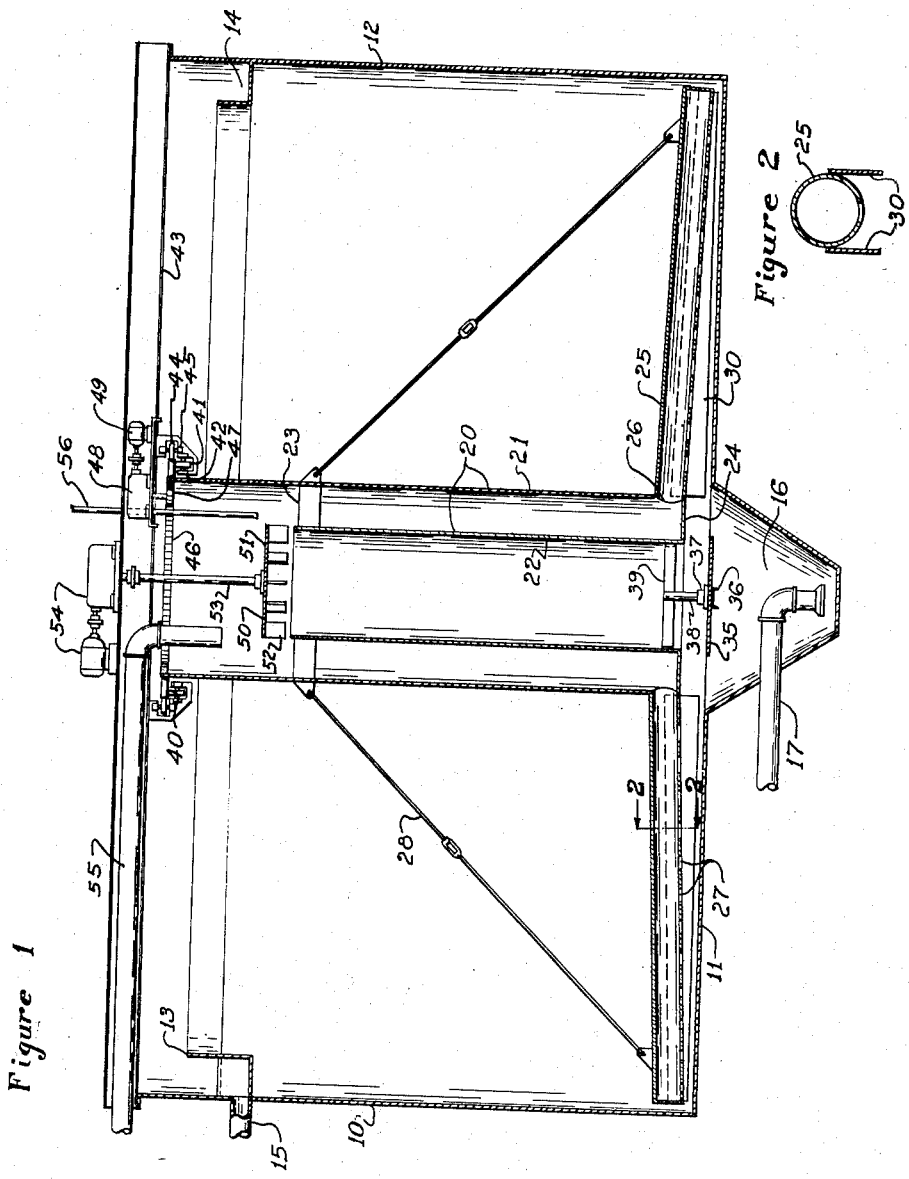
INVENTOR.
Walter J. Hughes
BY
AGENT

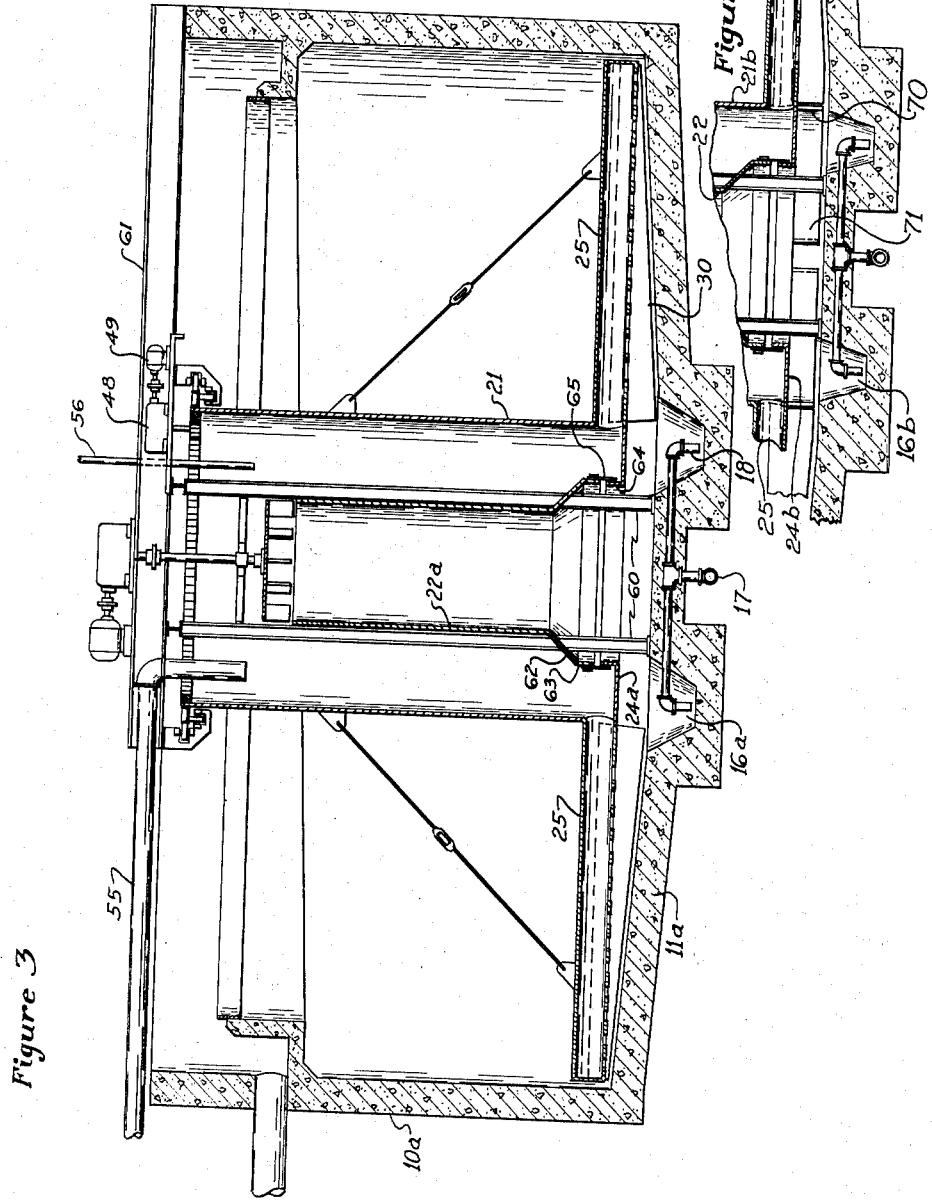

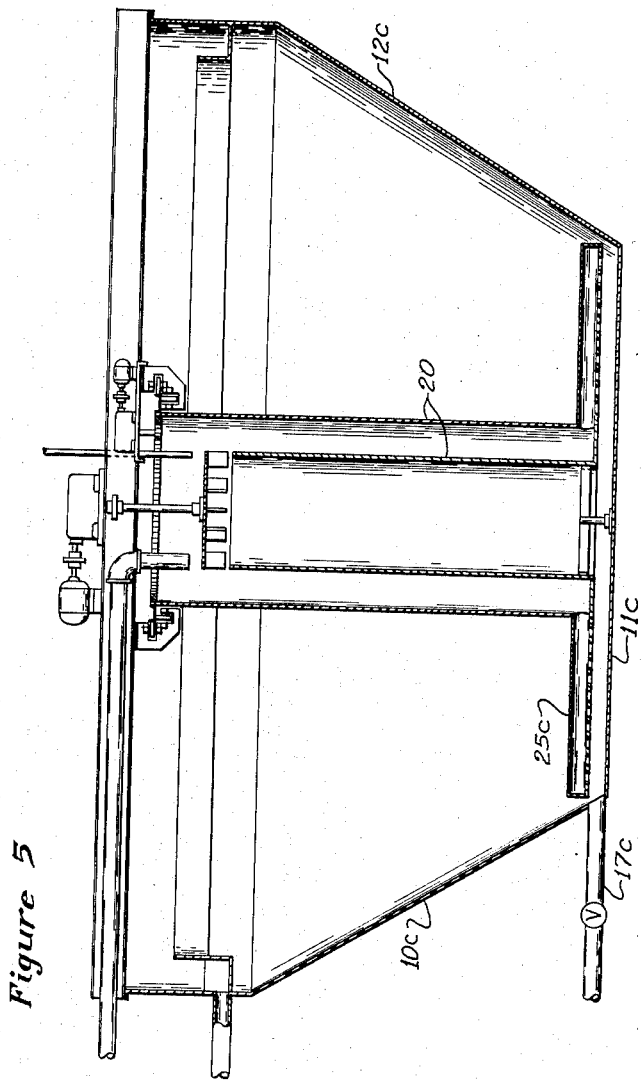

Patented Mar. 23, 1954

2,673,181

UNITED STATES PATENT OFFICE 2,673,181

SLURRY TYPE LIQUID TREATING APPARATUS

Walter J. Hughes, Tucson, Ariz., assignor to Infilco Incorporated, Tucson, Ariz., a corporation of Delaware Application February 26, 1951, Serial No. 212,761

14 Claims. (Cl. 210—16)

This invention relates to an apparatus for the continuous treatment of liquids to remove substances therefrom in solid form, and more particularly to an apparatus for what is commonly called slurry treatment of liquids.

It is an object of this invention to provide an improved slurry type liquid treating apparatus.

Another object of the invention is to adapt apparatus of the slurry type to the handling of heavy precipitate or mixtures of precipitate and gritty materials which tend to settle to the bottom of the tank.

Another object is to provide in a slurry type liquid treating apparatus uniform distribution of the mixture of slurry, incoming liquid and chemicals discharged from the mixing and reaction chamber over the entire cross sectional area of the surrounding portions of the tank, and a controlled return flow to the mixing and reaction chamber from the entire cross sectional area of the surrounding tank portions.

Another object is to provide an apparatus wherein slurry is circulated with considerable velocity in the lower portion of a tank without disturbing an overlying relatively quiescent slurry blanket.

Another object is to provide an apparatus of this general type wherein the floor of the tank is continuously swept free of deposit.

Other objects of the invention will become apparent upon consideration of the description and the claims which follow.

In slurry type liquid treating apparatus the liquid to be treated usually is introduced into a centrally located mixing and reaction zone where it is mixed with reagent in the presence of a slurry comprising solids separated from previously treated liquid and retained and accumulated in liquid undergoing treatment. The mixture is discharged from the mixing and reaction zone into a pool of slurry in the surrounding portion of the tank. An output portion of liquid rises upwardly through the slurry pool leaving behind in the suspended slurry blanket, as it is sometimes called, solid particles formed in the reactions between the liquid and the chemicals. The major portion of the mixture returns to the mixing and reaction zone to be mixed with further portions of liquid entering for treatment.

In this slurry type treatment it is important that the liqud discharged into the slurry pool be uniformly distributed over the entire cross sectional area of the pool to provide for uniform slurry blanket suspension. It is also of importance that the floor of the tank be kept free of sediment. In operation of slurry type treating units it has been found that very heavy particles formed in the treatment, or gritty material in the liquid under treatment sometimes cannot be held in suspension by the liquid circulation and settle to the floor of the tank from where they must be removed. In accordance with the present invention the liquid is discharged from the mixing and reaction zone through rotating conduits or arms extending radially across the tank, and the velocity of the liquid returning to the mixing and reaction chamber is utilized for sweeping the bottom of the tank. The inward return flow to the mixing and reaction chamber is confined to prevent disturbance of the overlying slurry blanket due to its relatively high velocity, and is directed to sweep any deposits into a centrally located sump.

The invention will be more readily understood by reference to the detailed description which follows and to the drawings, which form a part of this specification and wherein like reference characters in the several figures designate similar elements.

Figure 1 is a vertical cross-sectional view of one embodiment of the invention;

Figure 2 is a sectional view taken along line 2—2 of Figure 1;

Figure 3 is a vertical cross-sectional view of another embodiment of the invention which is particularly suitable for large tanks;

Figure 4 is a partial vertical cross-sectional view of a modified detail; and

Figure 5 is a vertical cross-sectional view of a simplified embodiment of the invention.

The tank 10, shown in Figure 1, may be of any suitable material, such as steel, and has a substantially flat bottom 11 and an upstanding boundary wall 12. Treated water overflows over a weir 13 into a launder 14 and is withdrawn through an effluent conduit 15. A depression or sludge sump 16 is located centrally in the bottom 11, and a sludge blowoff conduit 17 leads from the sump 16 to outside the tank 10.

A partition structure 20 is centrally arranged in the tank and comprises an outer tube 21 and an inner tube 22 which may be supported from the outer tube as by brackets 23. The lower edges of both tubes are spaced above the bottom of the tank. The upper end of the outer tube is at an elevation above the overflow edge of the weir 13, and the upper edge of the inner tube is below said overflow edge. The channel formed between the outer and inner tubes is closed at the bottom by a floor 24.

Hollow liquid distribution arms or conduits 25 extend from the outer tube radially across the tank 10. Preferably four equally spaced arms 25 are provided, each registering with a port 26 in the tube 21. The liquid may be discharged from the arms 25 through one continuous slot, but preferably a plurality of downwardly opening discharge orifices 27 are provided along the lower part of the arms, as shown. The orifices 27 may be in the form of round holes or longitudinal slots, and are suitably sized and spaced to provide for a substantially uniform distribution of liquid over the areas served. The outer ends of the arms can be supported from the upper part of the outer tube by any suitable means, such as by braces, or by cables 28, as shown. The arms 25 may be supported in horizontal position, but with a flat tank bottom it is preferred that they be inclined downwardly from the inner to the outer end, as shown, to provide for an inwardly increasing area below the arms for the return flow.

Baffle plates 30 are mounted on arms 25 and extend downwardly therefrom on each side, as best shown in Figure 2. Preferably these baffle plates decrease in vertical width from their inner to their outer ends, as shown in Figure 1, so that their lower edges are parallel to, or equidistant from, the bottom 11 of the tank 10.

A plate 35 is mounted between the lower end of the inner tube 22 and the sump 16. The plate 35 can be mounted in any suitable manner and may be stationary. For purposes of illustration, the plate 35 is shown supported by a bracket 36 which may extend across the sump 16. The plate 35 carries a guide bearing 37 wherein one end of a shaft 38 is journaled, the other end being fixed to a spider 39 mounted on the inner tube 22. This construction centers the partition structure 20 and prevents its tilting during rotation, and the plate 35 shelters the sump 16 from any turbulence set up by the return flow of slurry to the inner tube 22. The whole assembly of inner tube 22, outer tube 21, and arms 25 is rotatably supported by any suitable means. As shown in Figure 1 these means may take the form of a channel 40 surrounding the upper end of the outer tube 21 and riding on rollers 41 journaled in suitable bearings 42 which are supported from a beam or walkway 43 spanning the tank 10. A plurality of guide rollers 44 are journaled in bearings 45 which are also supported from the beam 43 and prevent side slipping of the channel 40 on its travel over the rollers 41. The partition structure is rotated by any suitable means, such as an internal ring gear 46 meshing with a pinion 47 which is mounted on the shaft of a speed reducer 48. The speed reducer is driven by any suitable motor 49, and the motor and reducer can be mounted on the beam 43.

Axially aligned within the partition structure 20 and at an elevation just above the upper edge of the inner tube 22 is a rotor 50. The rotor is preferably of the radial flow type and comprises a horizontal plate 51 and a plurality of vertical blades 52 affixed to the lower side of the plate. Such a rotor affords excellent mixing and is capable of pumping considerable quantities of liquid at very low heads. The rotor 50 is mounted on a shaft 53, which is driven by a motor-reducer 54, which can be mounted on the beam 43. Also supported by the beam 43 are a liquid inlet conduit 55 and a reagent inlet line 56. The liquid and reagent inlets preferably discharge, as shown, into the upper portion of the outer tube 21 adjacent the rotor 50. It is important that the liquid to be treated be mixed with the reagents in the presence of slurry. This affords an opportunity for the solid products of reaction formed in the treatment to deposit on previously formed slurry particles. Thus, there is no deposition upon the surfaces of the tubes 21 and 22 nor upon the insides of the arms 25. Since the rotor, in the arrangement of the inlets shown in the drawings, handles only returned slurry which is non-depositing, the rotor does not become encrusted.

The structure described provides a mixing and reaction chamber or zone within the partition structure 20, a path for a circulation from the mixing and reaction chamber through the arms 25 across the tank and through the portion of the tank underlying the arms 25 back to the mixing and reaction chamber, a relatively quiescent zone above the rotating arms 25 wherein the slurry blanket is suspended, and, overlying the slurry interface, a clarified liquid zone in the upper portion of the tank.

The operation of the apparatus will be readily understood. Liquid to be treated, entering through inlet conduit 55, and any reagent, entering through line 56, are mixed with slurry pumped upwardly through the inner tube 22 by rotation of the rotor 50. The downward flow of the mixture through the annular space or flow channel between the tubes 22 and 21 affords retention time for the reactions between liquid and reagent to be completed. The mixture enters the rotating arms 25 through ports 26 and is discharged under low head derived from the rotor 50 through the orifices 27 into the lower part of the slurry pool over laterally successive portions of the tank bottom as the arms 25 are rotated thereover. The orifices 27 are sized and spaced to obtain a substantially uniform distribution of the discharged liquid over the cross sectional area of the outer tank portion. Slurry issuing from the orifices 27 is confined to the area underlying the rotating arms by the baffles 30. The baffles 30 are just sufficiently spaced from the floor of the tank to provide an escapement for a through-put portion of liquid, which rises into the slurry blanket, displacing a like quantity of clear liquid from the slurry through the interface into the overlying clear water space from where it is withdrawn. The balance of the slurry discharged from the arms 25, which is usually a multiple of the throughput, is directed radially inwardly by the baffles 30 and returns through the open lower end of the inner tube 22 into the mixing and reaction chamber. On its return passage the liquid sweeps the floor of the tank with considerable velocity, but the turbulence of the inward flow is confined by the baffles, and thus does not cause any substantial disturbance of the overlying slurry blanket. The arms, therefore, can be rotated at a much higher speed than would be permissible without the baffles. One advantage of rotating the arms 25 at a relatively high speed is the more uniform distribution of the discharged slurry over the entire cross sectional area of the outer tank which provides a more uniform suspension of the slurry blanket. Further, deposits on the bottom of the tank are either resuspended in this relatively high velocity flow, or, if too heavy for resuspension, are swept across the floor toward the center of the tank, where they can deposit in the sump 16. Thus, the heaviest particles, which cannot be held in suspension by the circulation in the tank, are removed from the process, and lighter particles are retained for further growth and are reused in the process.

In the embodiment of the invention shown in Figure 3 the inner tube 22a is stationary, and only the outer tube 21 and the arms 25 rotate. In this embodiment the tank 10a is shown for purposes of exemplification as a concrete tank with a bottom 11a which slopes inwardly toward an annular sump 16a. Sludge is removed from the sump 16a by sludge pickup lines 18 which are connected to a sludge outlet pipe 17. The center portion of the floor 11a, which is surrounded by the sump 16a, supports columns or brackets 60 which form a support for the inner end of a walkway or a bridge 61. The inner tube 22a is affixed to and supported by the columns 60. The outer tube 21 is rotatably supported from the bridge 61 and is driven by a motor-reducer 49—48 in the same manner as described in connection with Figure 1.

The inner tube has an outwardly extending lower portion 62 and a cylindrical lower ring or collar 63. The floor 24a of the outer tube 21 has an upstanding collar 64, as shown. The collars 63 and 64 are slightly spaced from each other, and a sealing curtain 65 of flexible material, such as rubber or the like, is affixed to the upper collar 63 and hangs freely down over a portion of the lower collar 64 to prevent any substantial escape of liquid through the small gap between the two collars. The columns 60 extend through slots provided in the outwardly extending portion 62 of the inner tube 22a.

In this embodiment the arms 25 can extend horizontally, as the sloping bottom 11a affords an inwardly increasing area for the return flow. As in the embodiment of Figure 1 baffles 30 extend downwardly from the arms 25 and decrease in width vertically from their inner to their outer ends so that their lower edges are parallel to the sloping bottom of the tank.

The operation of this embodiment of the invention is the same as described in connection with Figure 1, except that the inner tube remains stationary while the outer tube and arms are rotated. This form of the apparatus is particularly suited for large tanks where a central support for the walkway is provided to reduce its span.

Figure 4 shows a modification of the outer tube which may be desirable where the liquid under treatment contains large quantities of heavy solids.

In this embodiment the outer tube 21b is extended downwardly below the floor 24b to adjacent the tank bottom, the lower edge of the tube being at the elevation of the lower edges of the baffle plates 30. The lower portion of the tube 21b forms a skirt 70 which surrounds the open top of the sump 16b and the lower open end of the inner tube 22. The space within the skirt 70 and below the floor 24b and the lower end of tube 22 forms a receiving chamber 71 into which the passageways below the rotating arms 25 and between the baffle plates 30 discharge the returning slurry through suitable ports in the skirt 70. The only other escapement from the passageways is the narrow gap between the tank bottom and the lower edges of the baffles 30 and the skirt 70. The area of the receiving chamber 71 should be larger than the combined area of the passageways so that the velocity of the slurry entering the chamber 71 decreases, permitting solids flushed from the bottom of the tank by the high velocity flow through the passageways to deposit into the underlying sump 16b. The return flow in this embodiment is positively confined and directed into the receiving chamber, and the bottom of the tank very efficiently washed.

The embodiment of the invention shown in Figure 5 is simplified in several respects and is particularly suitable for treatment of a liquid containing relatively small quantities of solids of somewhat light character.

The tank 10c of Figure 5 which may be of any suitable material, such as steel, has a flat bottom 11c and an upwardly expanding wall 12c. The entire wall 12c may be of inverted frusto-conical form, or, as shown, only the lower portion of the wall is in inverted frusto-conical form, and the upper portion is cylindrical. Obviously, instead of making the lower part of wall 11c in inverted frusto-conical shape, the wall may be cylindrical throughout and the desired slope obtained by a fill, as is well known in the art. The slurry circulation zone in this embodiment is relatively small but is sufficient for the small quantities of slurry for which this embodiment is contemplated. The large upwardly expanding space for the suspended slurry blanket provides an upwardly decreasing velocity which is very desirable when dealing with light solids as the velocity of the flow to and through the slurry blanket must be quite low to prevent disturbance of the blanket and entrainment of light solids by the rising liquid. The arms 25c in this embodiment can be horizontal and parallel to the bottom of the tank, and the baffles 30 can be dispensed with, as it is not necessary, when dealing with small quantities of slurry, to provide for a sharply confined and inwardly expanding return flow passageway. Solids are withdrawn directly from the slurry through a solids outlet conduit 17c. Obviously, the plate 35 can also be omitted in this embodiment. The partition structure 20 of Figure 5 is the same as shown in Figure 1 and is centered and rotatably supported and driven in similar manner. The operation of this embodiment is the same as described in connection with the other figures.

It will be obvious to those skilled in the art that the structures described and shown herein can be modified in some respects without departing from the spirit and scope of the invention. Accordingly, it is to be understood that the structural details shown and described herein are to be taken as illustrations but not as limitations of the invention.

I claim:

1. A slurry type liquid treating apparatus comprising a tank having a substantially flat bottom and an upstanding wall, an overflow from an upper portion of said tank, means for withdrawing solids from a lower portion of said tank, a mixing and reaction chamber axially aligned in said tank, said mixing and reaction chamber having a floor spaced above the bottom of the tank and a wall rising from said floor, a rotor in said chamber, inlet means for liquid to be treated and for any reagent used in the treatment discharging into said mixing and reaction chamber, said floor having an apertured central portion affording communication between the lower part of said tank and said mixing and reaction chamber, a hollow arm sealed to the wall of said mixing and reaction chamber and extending outwardly therefrom across the lowermost portion of said tank, the space within said arm being in hydraulic communication with said mixing and reaction chamber, said arm having means for discharging liquid downwardly therefrom, means for driving said rotor, and means for rotating said arm over said tank bottom, whereby successive portions of said tank bottom are flushed by the discharge from said arm.

2. A slurry type liquid treating apparatus comprising a tank having a substantially flat bottom and an upstanding wall, means for withdrawing solids from a lower portion of said tank, a treated liquid outlet from an upper portion of said tank, a partition structure rotatably mounted in said tank and forming therein a central mixing and reaction chamber having a floor spaced above the bottom of said tank and a boundary wall extending to adjacent the top of the tank, wall means within said mixing and reaction chamber forming therein an upflow section and a downflow section, a passageway from the lower portion of said tank through said floor into said upflow section, conduits affixed to, and in hydraulic communication with, said downflow section and extending outwardly therefrom across the lowermost portion of said tank, each conduit having a plurality of downwardly discharging orifices, a rotor in said mixing and reaction chamber affecting an inward flow across said bottom to said passageway to continuously flush said bottom, and to affect an upward flow through said passageway and upflow section, liquid inlet means discharging into said mixing and reaction chamber, means for introducing any reagents into said mixing and reaction chamber and means for rotating said rotor and said partition structure.

3. A slurry type liquid treating apparatus comprising a tank having a bottom and a boundary wall, partition means in said tank forming therein a central mixing and reaction chamber spaced above the bottom of said tank, inlet means for liquid to be treated and any reagent discharging into said mixing and reaction chamber, an outlet for treated liquid from an upper portion of said tank, a solids outlet from a lower portion of said tank, a passageway from the lower portion of said tank into said mixing and reaction chamber, a tubular wall in said mixing and reaction chamber forming therein an upflow section and a downflow section, communicating with each other at the upper end of said wall, a rotor in said mixing and reaction chamber positioned to cause an upward flow from the lower part of the tank through said passageway into and through said upflow section, and means for rotating said rotor, characterized by means rotatably supporting said mixing and reaction chamber, motor driven means for rotating said mixing and reaction chamber, a floor in said downflow section, a plurality of conduits extending from a lower part of said mixing and reaction chamber across said tank, said conduits being in hydraulic communication with said mixing and reaction chamber, each conduit having a plurality of downwardly discharging orifices spaced along its lower portion, and a baffle plate affixed to each side, said baffle plates extending downwardly from said conduit to adjacent the bottom of the tank, and a sump centrally located in said bottom, said solids outlet leading from said sump, said baffle plates confining the discharge from said conduits and directing it across the tank bottom toward said passageway, to flush said bottom radially inwardly and over said sump.

4. A slurry type liquid treating apparatus comprising a tank having a bottom and an upstanding wall, an overflow from an upper portion of said tank, a sump in a central part of said bottom, an outlet from said sump, a mixing and reaction chamber centrally mounted in said tank, said mixing and reaction chamber having a floor portion spaced above the bottom of the tank and a tubular wall surrounding said floor portion and extending upwardly to an elevation above said overflow, means for rotatably supporting said mixing and reaction chamber in said tank, a tube within said mixing and reaction chamber and forming with said tubular wall a flow channel, an overflow from the space within said tube into said flow channel, a passageway from the lower portion of said tank into said tube, a rotor within said mixing and reaction chamber and arranged to pump slurry through said passageway and upwardly through said tube, a liquid inlet discharging within said mixing and reaction chamber, means for introducing reagent into said mixing and reaction chamber, a plurality of hollow arms affixed to said tubular wall and in hydraulic communication with said flow channel, means for discharging liquid downwardly from said arms over the bottom area of said tank, baffle plates attached to each arm, one on each side thereof, each plate extending downwardly from its arm to adjacent the tank bottom and with its lower edge parallel to the tank bottom, and means for rotating said rotor and said mixing and reaction chamber.

5. The apparatus of claim 4, wherein said tubular wall extends also downwardly from said floor portion to adjacent the bottom of said tank.

6. The apparatus of claim 4 wherein the bottom of said tank is substantially flat, said arms are inclined downwardly from their inner to their outer ends, and the vertical extension of said baffle plates decreases from their inner to their outer ends.

7. The apparatus of claim 4 wherein the bottom of said tank slants toward the center, said arms are horizontally mounted, and the vertical extension of said baffle plates decreases from their inner to their outer ends.

8. A slurry type liquid treating apparatus comprising a tank having a bottom and a boundary wall, outlet means for liquid to be treated determining the normal liquid level in said tank, means for withdrawing solids from a lower portion of said tank, a partition structure rotatably supported in the center portion of said tank in spaced relationship to said bottom and comprising an open ended inner tube, an outer tube, and a floor portion between the lower edges of said tubes, said outer tube extending to an elevation above the normal liquid level in said tank and said inner tube terminating below said normal liquid level, inlet means for liquid to be treated and for reagent discharging within an upper portion of said partition structure, flow distributing conduits connected to, extending radially outwardly from, and in hydraulic communication with, the lower portion of said outer tube, each conduit having downwardly discharging orifices along its lower portion and a pair of baffle plates, one on each side, said baffle plates extending downwardly to adjacent the bottom of said tank and forming a confined flow area underneath said conduits, a rotor within said partition structure, said rotor being positioned to cause a circulation of liquid upwardly through said inner tube, downwardly between said outer and inner tubes, into said flow distributing conduits, out through said orifices and back through said confined area to the lower end of said inner tube, means for rotating said rotor, and means for rotating said partition structure.

9. A slurry type liquid treating apparatus comprising a tank having a bottom and an upstanding wall, an overflow from an upper portion of said tank, means for withdrawing solids from a lower portion of said tank, a mixing and reaction chamber centrally mounted in said tank and having an annular floor portion spaced above the bottom of the tank and a tubular wall extending from said floor portion to an elevation above said overflow, means for rotatably supporting said mixing and reaction chamber in said tank, a stationary tube supported within said mixing and reaction chamber and forming with said tubular wall a flow channel, said tube extending to an elevation below said overflow, a passageway from the lower portion of said tank into said stationary tube, a rotor within said mixing and reaction chamber and arranged to pump slurry upwardly through said passageway and said stationary tube, a liquid inlet discharging within said mixing and reaction chamber, means for introducing reagent into said mixing and reaction chamber, a plurality of hollow arms affixed to a lower portion of said tubular wall and in hydraulic communication with said flow channel, said arms having downwardly discharging orifices, baffle plates attached to said arms and extending downwardly from said arms to adjacent the tank bottom, and means for rotating said rotor and said mixing and reaction chamber.

10. A slurry type liquid treating apparatus comprising a tank having an outlet adjacent its top, a rotatably supported mixing chamber axially aligned in said tank, said mixing chamber having a boundary wall with a bottom edge terminating adjacent the bottom of said tank, and an annular floor portion at an elevation spaced above said bottom edge and forming a receiving chamber thereunder, a tube axially mounted in said mixing chamber and in hydraulic communication with said receiving chamber and extending to an upper level of said mixing chamber, a conduit opening into the mixing chamber above said floor portion and extending radially in the lower portion of said tank, plates depending from the sides of said conduit with their lower edges terminating adjacent the bottom of said tank to form a passageway underneath said conduit, the said passageway opening into said receiving chamber at its inner end, said conduit having an orifice discharging into said passageway, motor driven means positioned to circulate slurry inwardly through said passageway and through said receiving chamber to said mixing chamber, upwardly therein through said tube and then downwardly to and outwardly through said conduit in an amount in excess of the flow of liquid to be treated, a sump underlying said receiving chamber and open thereto, means for removing solids from said sump, inlet means for liquid to be treated and any reagent therefor discharging into the upper part of said mixing chamber, an annular slurry suspension chamber between the outer wall of the tank and the central mixing chamber, through which treated liquid rises to said outlet, and motor means for rotating said mixing chamber and said motor driven means.

11. In a slurry type liquid treatment apparatus of the type described, a tank having an outlet adjacent its top, wall means forming an outer annular chamber within said tank wherein treated liquid separates from a slurry suspension and rises toward said outlet, and a central mixing chamber adapted to receive incoming liquid to be treated, reagent for the treatment thereof and returned slurry, centrally located slurry return inlet means around which the said mixing chamber is formed, a conduit radially extending from said mixing chamber adjacent to but spaced from the bottom of said tank, said conduit having downwardly discharging distributing openings, a centrally placed sump and a discharge conduit from said sump, said sump being spaced beneath the said mixing chamber and slurry return inlet means, means for rotatably supporting said mixing chamber and said conduit, motor means for rotating said mixing chamber and said conduit, and motor driven means adapted to circulate slurry through said slurry inlet means into and through said mixing chamber and said conduit in amount substantially in excess of the flow of liquid to be treated.

12. A slurry type liquid treating apparatus comprising a tank having a flat bottom and an inclined wall forming in said tank a rising space of upwardly increasing cross-sectional area, a liquid outlet from the upper portion of said tank, means for withdrawing solids from a lower portion of said tank, a mixing and reaction chamber axially aligned in said tank and having a floor spaced above said bottom and a boundary wall extending upwardly from said floor, rotatable supporting means for said mixing and reaction chamber, a tube centrally aligned in said mixing and reaction chamber and in hydraulic communication with the lower portion of said tank through said floor, the upper end of said tube being at a lower elevation than the upper end of said boundary wall, a distribution conduit extending from a lower portion of said boundary wall across a lower portion of said tank and in hydraulic communication with said mixing and reaction chamber, said conduit having downwardly discharging orifices, means for introducing liquid to be treated and reagent into said mixing and reaction chamber, a rotor in said mixing and reaction chamber constructed and positioned to cause a flow of slurry discharged from said conduit across the bottom of said tank into and through said tube, in excess of the flow of slurry to be treated, and motor means for rotating said mixing and reaction chamber and said rotor.

13. A slurry type liquid treating apparatus comprising a tank having a substantially flat bottom and an upstanding wall, treated liquid outlet means from an upper portion of said tank, means for withdrawing solids from a lower portion of said tank, a partition axially aligned and rotatably supported in said tank and extending in spaced relationship to said bottom from the lowermost portion of said tank to an elevation above said treated liquid outlet means, inlet means for liquid to be treated and reagent discharging into the space within said partition, a plurality of conduits affixed to the lower end of said partition and in hydraulic communication with the space enclosed thereby, and having downwardly discharging orifice means, said conduits extending horizontally from said partition to adjacent said upstanding wall sufficiently close to the tank bottom that the liquid discharged from said orifice means flushes said tank bottom, a floor in said partition having a central apertured portion, a second partition surrounding said apertured portion and extending from said floor upwardly within said first partition, an overflow from the space within said second partition to the space between said second and first partitions, a rotor mounted within said first partition and having a pumping capacity in excess of the quantity of newly incoming liquid to be treated and effecting upon its rotation a flow of liquid discharged from said orifice means inwardly across said tank bottom and upwardly through said apertured portion and the space within said second partition, and means for rotating said first partition and said rotor.

14. In a slurry type liquid treatment apparatus of the type described, a tank having a substantially flat bottom and an upstanding wall and having an overflow adjacent its top and means for withdrawing solids from a lower portion thereof, wall means forming an outer annular chamber within said tank wherein treated liquid separates from a slurry suspension and rises toward said outlet, and a central mixing chamber adapted to receive incoming liquid to be treated, reagent for the treatment thereof and returned slurry, said mixing chamber having a floor spaced above the bottom of the tank, centrally located slurry return inlet means in said floor, a conduit radially extending from said mixing chamber adjacent to but spaced from the bottom of said tank, said conduit having downwardly discharging distributing openings, inlet means for liquid to be treated and for any reagent used in the treatment discharging into said mixing and reaction chamber, means for rotatably supporting said mixing chamber and said conduit, motor means for rotating said mixing chamber and said conduit, and motor driven means adapted to circulate slurry through said slurry inlet means into and through said mixing chamber and said conduit in amount substantially in excess of the flow of liquid to be treated.

WALTER J. HUGHES.

References Cited in the file of this patent

UNITED STATES PATENTS

| Number | Name | Date |
|---|---|---|
| 2,245,587 | Hughes | June 17, 1941 |
| 2,348,123 | Green et al. | May 2, 1944 |
| 2,355,069 | Green | Aug. 8, 1944 |
| 2,391,738 | Prager | Dec. 25, 1945 |
| 2,422,258 | Prager | June 17, 1947 |
| 2,425,371 | Green | Aug. 12, 1947 |
| 2,580,761 | Green | Jan. 1, 1952 |